(12) United States Patent
Lin

(10) Patent No.: US 9,542,935 B2
(45) Date of Patent: Jan. 10, 2017

(54) VOICE RECOGNITION FUNCTION REALIZING METHOD AND DEVICE

(71) Applicant: ZTE CORPORATION, Shenzhen, Guangdong Province (CN)

(72) Inventor: Junxuan Lin, Shenzhen (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 0 days.

(21) Appl. No.: 14/431,487

(22) PCT Filed: Jun. 17, 2013

(86) PCT No.: PCT/CN2013/077306
§ 371 (c)(1),
(2) Date: Apr. 24, 2015

(87) PCT Pub. No.: WO2013/182086
PCT Pub. Date: Dec. 12, 2013

(65) Prior Publication Data
US 2015/0243280 A1   Aug. 27, 2015

(30) Foreign Application Priority Data
Sep. 27, 2012 (CN) .......................... 2012 1 0370145

(51) Int. Cl.
G10L 15/22 (2006.01)
G10L 15/08 (2006.01)
(Continued)

(52) U.S. Cl.
CPC .............. *G10L 15/08* (2013.01); *G10L 17/22* (2013.01); *H04M 1/271* (2013.01); *H04M 2250/12* (2013.01); *H04M 2250/74* (2013.01)

(58) Field of Classification Search
USPC .......................................................... 704/275
See application file for complete search history.

(56) References Cited

U.S. PATENT DOCUMENTS 6,070,140 A * 5/2000 Tran ........................ G10L 15/26
704/232
6,532,447 B1 * 3/2003 Christensson ........ H04M 1/271
327/517
(Continued)

FOREIGN PATENT DOCUMENTS

CN           1713660 A    12/2005
CN         101800576 A     8/2010
(Continued)

*Primary Examiner* — Abul Azad
(74) *Attorney, Agent, or Firm* — Ling Wu; Stephen Yang; Ling and Yang Intellectual Property

(57) ABSTRACT

The embodiment of the present invention provides a method for realizing a voice recognition function, including: setting a corresponding relationship between the attitude parameter of a mobile terminal body and a voice recognition mode (S10); if a gravity sensor in the mobile terminal detects that a change of the attitude parameter of the mobile terminal body satisfies a condition of switching the voice recognition mode, then switching the voice recognition mode, and performing voice recognition under the switched voice recognition mode (S20). Through self-adaptively switching the voice recognition mode of the mobile terminal, the voice recognition function of the mobile terminal can be made to free the hands of a user to the greatest extent and save power consumption. An apparatus for realizing the voice recognition function corresponding to the method is also disclosed.

4 Claims, 2 Drawing Sheets

Before inclination

After inclination

(51) Int. Cl.
    *H04M 1/27*     (2006.01)
    *G10L 17/22*     (2013.01)

(56) References Cited

U.S. PATENT DOCUMENTS

| | | | |
|---|---|---|---|
| 2004/0199391 A1* | 10/2004 | Yoon | G10L 15/26 704/275 |
| 2007/0216584 A1* | 9/2007 | Nishikido | H01Q 1/242 343/702 |
| 2011/0021252 A1 | 1/2011 | Sip | |
| 2012/0034904 A1 | 2/2012 | LeBeau et al. | |
| 2013/0201093 A1* | 8/2013 | Kim | G06F 3/033 345/156 |

FOREIGN PATENT DOCUMENTS

| | | |
|---|---|---|
| CN | 101873386 A | 10/2010 |
| CN | 201854328 U | 6/2011 |
| JP | 2005311533 A | 11/2005 |
| JP | 2008160886 A | 7/2008 |

\* cited by examiner

VOICE RECOGNITION FUNCTION REALIZING METHOD AND DEVICE

TECHNICAL FIELD

The present document relates to the field of communication terminal technology, and in particular, to a method and apparatus for realizing a voice recognition function.

BACKGROUND OF THE RELATED ART

With the constant increasing of the functions of the intelligent terminal and the portable device, the voice recognition technology is increasingly applied extensively; for example, the voice recognition function is very practical during driving or when the hands need to do other things.

According to the current situation, most mobile terminals with the voice recognition function provide the key or the button to the user to start the voice recognition procedure; the user can send the voice instruction after pressing the key or the button, and the terminal makes the corresponding operation according to the voice instruction of the user. However, there is a very big problem to do it in this way that the user still needs to rely on the hands to click the mobile terminal.

In order to further free the hands of the user, the voice recognition function supporting the voice wake-up technology also appears at present. After the voice wake-up technology is used, the terminal is in the audio detection state all the time, and once special voice wake-up instruction (such as, Hey, voice assistant) is detected, then the voice recognition function is started to identify the voice instruction of the user. The voice wake-up technology can further free the hands of the user, however, because the terminal will consume the electric quantity of the battery to monitor the voice wake-up instruction, the mobile terminal supporting the voice wake-up technology has the problem that the electric quantity is consumed fast.

Therefore, how to make the voice recognition function of the mobile terminal not only free the hands of the user to the greatest extent but also save the power consumption is a technical problem required to be solved.

SUMMARY OF THE INVENTION

The embodiment of the present invention provides a method and apparatus for realizing a voice recognition function, which can enable the voice recognition function of the mobile terminal to free the hands of the user to the greatest extent and save power consumption.

The embodiment of the present invention provides a method for realizing a voice recognition function, comprising:

setting a corresponding relationship between an attitude parameter of a mobile terminal body and a voice recognition mode;

if a gravity sensor in the mobile terminal detects that a change of the attitude parameter of the mobile terminal body satisfies a condition of switching the voice recognition mode, then switching the voice recognition mode, and performing voice recognition under a switched voice recognition mode.

Preferably, the attitude parameter of the mobile terminal body comprises: an inclination angle of the mobile terminal body relative to a horizontal plane.

Preferably, the voice recognition mode comprises a common mode and a voice wake-up mode.

Preferably, setting a corresponding relationship between an attitude parameter of a mobile terminal body and a voice recognition mode comprises: setting a corresponding relationship between the range of an inclination angle of the mobile terminal body relative to the horizontal plane and the voice recognition mode, wherein:

the inclination angle of the mobile terminal body relative to the horizontal plane belongs to a first angle interval, corresponding to the common mode of the voice recognition mode, and the inclination angle of the mobile terminal body relative to the horizontal plane belongs to a second angle interval, corresponding to the voice wake-up mode of the voice recognition mode; wherein the first angle interval is not intersected with the second angle interval.

Preferably, if a gravity sensor in the mobile terminal detects that a change of the attitude parameter of the mobile terminal body satisfies a condition of switching the voice recognition mode, then the voice recognition mode is switched, comprising: if the gravity sensor in the mobile terminal detects that a change of the inclination angle of the mobile terminal body relative to the horizontal plane satisfies the condition of switching the voice recognition mode, then switching the voice recognition mode, wherein:

if the inclination angle of the mobile terminal body relative to the horizontal plane is changed from the first angle interval to the second angle interval, then the voice recognition mode of the mobile terminal is switched from the common mode to the voice wake-up mode; and if the inclination angle of the mobile terminal body relative to the horizontal plane is changed from the second angle interval to the first angle interval, then the voice recognition mode of the mobile terminal is switched from the voice wake-up mode to the common mode.

In order to solve the above-mentioned technical problem, the embodiment of the present invention further provides an apparatus for realizing a voice recognition function, comprising:

a setting module, configured to: set a corresponding relationship between an attitude parameter of a mobile terminal body and a voice recognition mode; and a switching module, configured to: when a gravity sensor in the mobile terminal detects that a change of the attitude parameter of the mobile terminal body satisfies a condition of switching the voice recognition mode, switch the voice recognition mode, and perform voice recognition under a switched voice recognition mode.

Preferably, the attitude parameter of the mobile terminal body comprises: an inclination angle of the mobile terminal body relative to a horizontal plane.

Preferably, the voice recognition mode comprises a common mode and a voice wake-up mode.

Preferably, the setting module is configured to: set a corresponding relationship between the range of an inclination angle of the mobile terminal body relative to a horizontal plane and the voice recognition mode, wherein:

the inclination angle of the mobile terminal body relative to the horizontal plane belongs to a first angle interval, corresponding to the common mode of the voice recognition mode, and the inclination angle of the mobile terminal body relative to the horizontal plane belongs to a second angle interval, corresponding to the voice wake-up mode of the voice recognition mode; wherein the first angle interval is not intersected with the second angle interval.

Preferably, the switching module is configured to: when a gravity sensor in the mobile terminal detects that a change of the inclination angle of the mobile terminal body relative to the horizontal plane satisfies the condition of switching the voice recognition mode, switch the voice recognition mode, wherein:

if the inclination angle of the mobile terminal body relative to the horizontal plane is changed from the first angle interval to the second angle interval, then the voice recognition mode of the mobile terminal is switched from the common mode to the voice wake-up mode; and if the inclination angle of the mobile terminal body relative to the horizontal plane is changed from the second angle interval to the first angle interval, then the voice recognition mode of the mobile terminal is switched from the voice wake-up mode to the common mode.

Through self-adaptively switching the voice recognition mode of the mobile terminal, the above-mentioned method and apparatus can enable the voice recognition function of the mobile terminal to free the hands of the user to the greatest extent and save power consumption.

PREFERRED EMBODIMENTS OF THE PRESENT INVENTION

The embodiment of the present invention is described in detail hereinafter with reference to the accompanying drawings. It should be illustrated that, in the case of not conflicting, the embodiments in the present application and features in these embodiments can be arbitrarily combined with each other.

Figure 1:
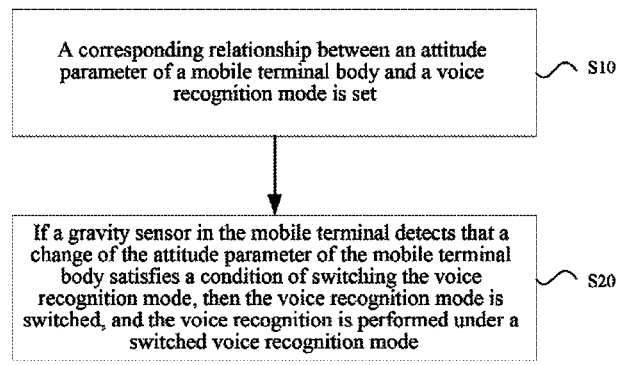
FIG. 1 is a flow chart of a method for realizing a voice recognition function of an embodiment of the present invention.

As shown in FIG. 1, the embodiment of the present invention provides a method for realizing a voice recognition function, including the following steps.

In S10, a corresponding relationship between an attitude parameter of a mobile terminal body and a voice recognition mode is set.

In S20, if a gravity sensor in the mobile terminal detects that a change of the attitude parameter of the mobile terminal body satisfies a condition of switching the voice recognition mode, then the voice recognition mode is switched, and the voice recognition is performed under a switched voice recognition mode.

In step S10, the attitude parameter of the mobile terminal body includes: an inclination angle of the mobile terminal body relative to a horizontal plane.

The inclination angle of the mobile terminal body relative to the horizontal plane refers to: the inclination angle of the mobile terminal body relative to the horizontal plane sensed by the gravity sensor in the mobile terminal.

Figure 2:
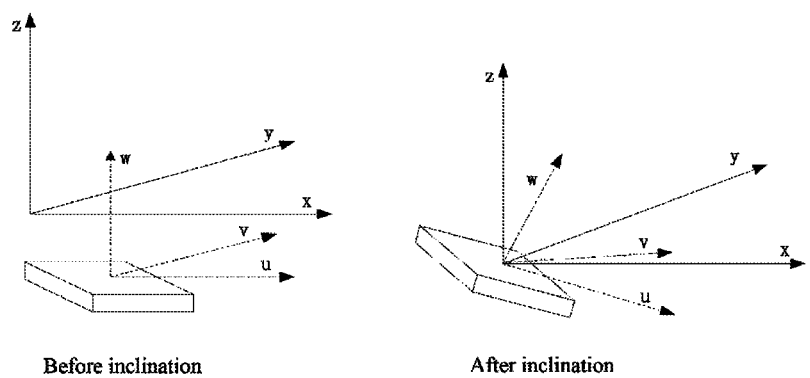
FIG. 2 is a diagram of an inclination angle of a mobile terminal body of an embodiment of the present invention.

As shown in FIG. 2, the space coordinate system formed by the x-axis, the y-axis and the z-axis is a reference coordinate system, wherein the z-axis represents the gravity direction, and the xy plane formed by the x-axis and y-axis represents the horizontal plane perpendicular to the gravity direction. The gravity sensor can be realized by using the piezoelectric effect, which is simply measuring the size of component forces in the two orthogonal directions of gravity of a slice of heavy object (the heavy object and the piezo-electric plate are integrated as a whole) within the gravity sensor, to judge the direction of the horizontal plane of the mobile terminal. The space coordinate system formed by the u-axis, the v-axis and the w-axis is the space coordinate system determined by the gravity sensor in the mobile terminal, and the uv plane formed by the u-axis and v-axis represents the horizontal plane of the mobile terminal obtained by the gravity sensor, and the w-axis is perpendicular to the uv plane. The inclination angle θ of the mobile terminal body relative to the horizontal plane sensed by the gravity sensor in the mobile terminal is: the included angle of the uv plane and the xy plane, 0°≤θ≤180°; for example, when the mobile phone is put in the horizontal plane with the screen upwards, θ is 0°; and when the mobile phone is put in the horizontal plane with the underside upwards, θ is 180°

The voice recognition mode includes a common mode and a voice wake-up mode. Under the common mode, it is not supported to wake up the mobile phone by the voice command; and under the voice wake-up mode, the mobile phone can be woke up through the voice wake-up command of the user.

Setting a corresponding relationship between an attitude parameter of a mobile terminal body and a voice recognition mode includes: setting a corresponding relationship between the range of the inclination angle of the mobile terminal body relative to the horizontal plane and the voice recognition mode, wherein:

the inclination angle of the mobile terminal body relative to the horizontal plane belongs to a first angle interval, corresponding to the common mode of the voice recognition mode, and the inclination angle of the mobile terminal body relative to the horizontal plane belongs to a second angle interval, corresponding to the voice wake-up mode of the voice recognition mode; wherein the first angle interval is not intersected with the second angle interval. For example, the first angle interval is 0°:15°, and the second angle interval is 30°:180°.

In step S20, if a gravity sensor in the mobile terminal detects that a change of the attitude parameter of the mobile terminal body satisfies a condition of switching the voice recognition mode, then the voice recognition mode is switched, including: if the gravity sensor in the mobile terminal detects that a change of the inclination angle of the mobile terminal body relative to the horizontal plane satisfies the condition of the switching voice recognition mode, then switching the voice recognition mode, specifically including that:

if the inclination angle of the mobile terminal body relative to the horizontal plane is changed from the first angle interval to the second angle interval, then the voice recognition mode of the mobile terminal is switched from the common mode to the voice wake-up mode; and if the inclination angle of the mobile terminal body relative to the horizontal plane is changed from the second angle interval to the first angle interval, then the voice recognition mode of the mobile terminal is switched from the voice wake-up mode to the common mode.

The mobile terminal performs the voice recognition under the switched voice recognition mode, including the following steps.

If the mobile terminal is under the common mode, then the mobile terminal detects whether the user clicks the start button or key of the voice recognition; if yes, then it starts to receive and identify the voice instruction of the user, and performs the corresponding operation according to the voice instruction of the user.

If the mobile terminal is under the voice wake-up mode, then the mobile terminal judges whether the correct voice wake-up instruction is monitored; if yes, then it starts to receive and identify the voice instruction of the user, and performs the corresponding operation according to the voice instruction of the user.

Under the voice wake-up mode, the power consumption of the mobile terminal when monitoring the voice wake-up instruction of the user is less than the power consumption of the mobile terminal when receiving and identifying the voice instruction of the user.

Figure 3:
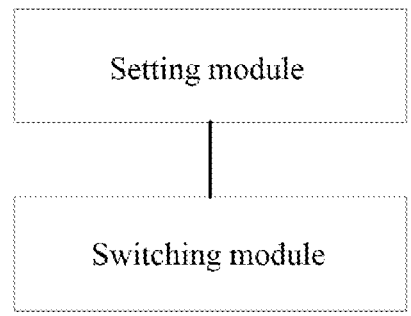
FIG. 3 is a structure diagram of an apparatus for realizing a voice recognition function of an embodiment of the present invention.

As shown in FIG. 3, the embodiment of the present invention provides an apparatus for realizing a voice recognition function, including:

a setting module, configured to: set a corresponding relationship between an attitude parameter of a mobile terminal body and a voice recognition mode; and a switching module, configured to: when a gravity sensor in the mobile terminal detects that a change of the attitude parameter of the mobile terminal body satisfies a condition of switching the voice recognition mode, switch the voice recognition mode, and perform voice recognition under a switched voice recognition mode.

The attitude parameter of the mobile terminal body can include: an inclination angle of the mobile terminal body relative to a horizontal plane.

The voice recognition mode can include a common mode and a voice wake-up mode.

Setting a corresponding relationship between an attitude parameter of a mobile terminal body and a voice recognition mode includes: setting a corresponding relationship between the range of an inclination angle of the mobile terminal body relative to the horizontal plane and the voice recognition mode, specifically including that:

the inclination angle of the mobile terminal body relative to the horizontal plane belongs to a first angle interval, corresponding to the common mode of the voice recognition mode, and the inclination angle of the mobile terminal body relative to the horizontal plane belongs to a second angle interval, corresponding to the voice wake-up mode of the voice recognition mode; wherein the first angle interval is not intersected with the second angle interval.

If a gravity sensor in the mobile terminal detects that a change of the attitude parameter of the mobile terminal body satisfies a condition of switching the voice recognition mode, then the voice recognition mode is switched, including: if the gravity sensor in the mobile terminal detects that a change of the inclination angle of the mobile terminal body relative to the horizontal plane satisfies the condition of switching the voice recognition mode, then switching the voice recognition mode, specifically including that:

if the inclination angle of the mobile terminal body relative to the horizontal plane is changed from the first angle interval to the second angle interval, then the voice recognition mode of the mobile terminal is switched from the common mode to the voice wake-up mode; and if the inclination angle of the mobile terminal body relative to the horizontal plane is changed from the second angle interval to the first angle interval, then the voice recognition mode of the mobile terminal is switched from the voice wake-up mode to the common mode.

The above-mentioned embodiment provides a method and apparatus for realizing a voice recognition function, to set the corresponding relationship between the attitude parameter of the mobile terminal body and the voice recognition mode; if it is detected that the change of the attitude parameter of the mobile terminal body satisfies the condition of switching the voice recognition mode, then the voice recognition mode is switched, and the voice recognition is performed under the switched voice recognition mode; through self-adaptively switching the voice recognition mode of the mobile terminal, the above-mentioned method and apparatus can enable the voice recognition function of the mobile terminal to free the hands of the user to the greatest extent and save power consumption.

It can be understood by those skilled in the art that all or part of steps in the above-mentioned method can be fulfilled by programs instructing the relevant hardware components, and the programs can be stored in a computer readable storage medium such as a read only memory, a magnetic disk or an optical disk, etc. Alternatively, all or part of the steps in the above-mentioned embodiments can be implemented with one or more integrated circuits. Accordingly, each module/unit in the above-mentioned embodiments can be implemented in the form of hardware, or in the form of software function module. The present document is not limited to any specific form of the combination of the hardware and software.

It should be illustrated that the present document can have a variety of other embodiments. Those skilled in the art can make the corresponding modifications and variations according to the present document without departing from the spirit and essence of the present document. And all of these modifications or the variations should be included in the protection scope of the appended claims of the present document.

INDUSTRIAL APPLICABILITY

Through self-adaptively switching the voice recognition mode of the mobile terminal, the embodiment of the present invention can enable the voice recognition function of the mobile terminal to free the hands of the user to the greatest extent and save power consumption.

What is claimed is:

1. A method for realizing a voice recognition function, comprising:

setting a corresponding relationship between an attitude parameter of a mobile terminal body and a voice recognition mode;

when a change of the attitude parameter of the mobile terminal body detected by a gravity sensor in a mobile terminal satisfies a condition of switching the voice recognition mode, then switching the voice recognition mode, and performing voice recognition under the switched voice recognition mode;

wherein, the attitude parameter of the mobile terminal body comprises an inclination angle of the mobile terminal body relative to a horizontal plane, and the voice recognition mode comprises a common mode and a voice wake-up mode; and wherein, setting a corresponding relationship between an attitude parameter of a mobile terminal body and a voice recognition mode comprises: setting a corresponding relationship between a range of the inclination angle of the mobile terminal body relative to the horizontal plane and the voice recognition mode, wherein:

the inclination angle of the mobile terminal body relative to the horizontal plane belongs to a first angle interval, corresponding to the common mode of the voice recognition mode, and the inclination angle of the mobile terminal body relative to the horizontal plane belongs to a second angle interval, corresponding to the voice wake-up mode of the voice recognition mode; wherein the first angle interval is not intersected with the second angle interval.

2. The method according to claim 1, wherein:
when the gravity sensor in the mobile terminal detects that the change of the attitude parameter of the mobile terminal body satisfies the condition of switching the voice recognition mode, then switching the voice recognition mode, comprises: if the gravity sensor in the mobile terminal detects that a change of the inclination angle of the mobile terminal body relative to the horizontal plane satisfies the condition of switching the voice recognition mode, then switching the voice recognition mode, wherein:
if the inclination angle of the mobile terminal body relative to the horizontal plane is changed from the first angle interval to the second angle interval, then the voice recognition mode of the mobile terminal is switched from the common mode to the voice wake-up mode; and if the inclination angle of the mobile terminal body relative to the horizontal plane is changed from the second angle interval to the first angle interval, then the voice recognition mode of the mobile terminal is switched from the voice wake-up mode to the common mode.

3. An apparatus for realizing a voice recognition function, comprising:
a setting module, configured to: set a corresponding relationship between an attitude parameter of a mobile terminal body and a voice recognition mode; and
a switching module, configured to: when a change of the attitude parameter of the mobile terminal body detected by a gravity sensor in a mobile terminal satisfies a condition of switching the voice recognition mode, switch the voice recognition mode, and perform voice recognition under the switched voice recognition mode;
wherein, the attitude parameter of the mobile terminal body comprises an inclination angle of the mobile terminal body relative to a horizontal plane, and the voice recognition mode comprises a common mode and a voice wake-up mode; and
wherein, the setting module is configured to: set a corresponding relationship between a range of the inclination angle of the mobile terminal body relative to the horizontal plane and the voice recognition mode, wherein:
the inclination angle of the mobile terminal body relative to the horizontal plane belongs to a first angle interval, corresponding to the common mode of the voice recognition mode, and
the inclination angle of the mobile terminal body relative to the horizontal plane belongs to a second angle interval, corresponding to the voice wake-up mode of the voice recognition mode; wherein the first angle interval is not intersected with the second angle interval.

4. The apparatus according to claim 3, wherein:
the switching module is configured to: when the gravity sensor in the mobile terminal detects that a change of the inclination angle of the mobile terminal body relative to the horizontal plane satisfies a condition of switching the voice recognition mode, switch the voice recognition mode, wherein:
if the inclination angle of the mobile terminal body relative to the horizontal plane is changed from the first angle interval to the second angle interval, then the voice recognition mode of the mobile terminal is switched from the common mode to the voice wake-up mode; and if the inclination angle of the mobile terminal body relative to the horizontal plane is changed from the second angle interval to the first angle interval, then the voice recognition mode of the mobile terminal is switched from the voice wake-up mode to the common mode.

* * * * *